(12) United States Patent
Casey

(10) Patent No.: US 7,452,306 B2
(45) Date of Patent: Nov. 18, 2008

(54) DRIVE SYSTEM HAVING SLIP CONTROL

(75) Inventor: Kent A. Casey, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 243 days.

(21) Appl. No.: 11/083,954

(22) Filed: Mar. 21, 2005

(65) Prior Publication Data

US 2006/0211535 A1 Sep. 21, 2006

(51) Int. Cl.
*B60K 28/16* (2006.01)
(52) U.S. Cl. .......................... 477/97; 475/125; 180/197
(58) Field of Classification Search ................. 180/197; 477/52, 900; 475/125
See application file for complete search history.

(56) References Cited

U.S. PATENT DOCUMENTS

| | | | |
|---|---|---|---|
| 2,426,075 A | 8/1947 | Weybrew | |
| 2,453,483 A | 11/1948 | Yingling | |
| 4,012,677 A | 3/1977 | Rist et al. | |
| 4,719,361 A | 1/1988 | Brubaker | |
| 5,343,971 A | 9/1994 | Heidelberg et al. | |
| 5,365,431 A | 11/1994 | Minezawa et al. | |
| 5,406,486 A * | 4/1995 | Kamio et al. | 701/84 |
| 5,535,124 A * | 7/1996 | Hosseini et al. | 701/83 |
| 5,804,935 A | 9/1998 | Radev | |
| 5,848,664 A * | 12/1998 | Kaspar | 180/308 |
| 5,880,408 A | 3/1999 | Schreiner | |
| 6,275,762 B1 | 8/2001 | Salg | |
| 6,560,549 B2 | 5/2003 | Fonkalsrud et al. | |
| 6,666,022 B1 | 12/2003 | Yoshimatsu et al. | |
| 6,704,627 B2 | 3/2004 | Tatara et al. | |
| 6,751,894 B2 | 6/2004 | Verseef | |
| 6,799,652 B2 | 10/2004 | Nissen et al. | |
| 6,808,470 B2 | 10/2004 | Boll | |
| 6,842,681 B2 | 1/2005 | Imai et al. | |
| 6,958,587 B1 | 10/2005 | Naik | |
| 2002/0019284 A1 | 2/2002 | Aikawa et al. | |
| 2003/0111282 A1 * | 6/2003 | Landes | 180/197 |
| 2004/0135527 A1 | 7/2004 | Tatara et al. | |

(Continued)

FOREIGN PATENT DOCUMENTS

AU 3 205 877 7/1979

(Continued)

OTHER PUBLICATIONS

U.S. Appl. No. 11/084,123, filed Mar. 21, 2005.

(Continued)

*Primary Examiner*—Sherry Estremsky
*Assistant Examiner*—Edwin A Young
(74) *Attorney, Agent, or Firm*—Finnegan, Henderson, Farabow, Garrett & Dunner

(57) ABSTRACT

A drive system for a work machine is disclosed. The drive system has at least one driven traction device and a transmission operatively connected to the at least one driven traction device. The transmission is configured to drive the at least one driven traction device. The drive system further has a controller configured to determine a ground tractive capacity associated with the at least one driven traction device and to limit an amount of torque transmitted from the transmission to the at least one driven traction device when the amount of torque to be transmitted will exceed the ground tractive capacity.

33 Claims, 2 Drawing Sheets

U.S. PATENT DOCUMENTS

| | | |
|---|---|---|
| 2005/0099146 A1 | 5/2005 | Nishikawa et al. |
| 2002/0124457 A1 | 6/2005 | Nakamori et al. |
| 2005/0206337 A1 | 9/2005 | Bertsch et al. |
| 2005/0252706 A1 | 11/2005 | Thomas |
| 2006/0020383 A1 | 1/2006 | Betz et al. |
| 2006/0025917 A1 | 2/2006 | Pandey et al. |
| 2006/0069487 A1 | 3/2006 | Sychra et al. |
| 2006/0112781 A1 | 6/2006 | Kuras et al. |
| 2006/0126250 A1 | 6/2006 | Sychra et al. |
| 2006/0191732 A1 | 8/2006 | Lunzman et al. |

FOREIGN PATENT DOCUMENTS

| | | |
|---|---|---|
| DE | 40 11 291 | 10/1991 |
| GB | 1 349 077 | 3/1974 |

OTHER PUBLICATIONS

Roth, G. "Dieselelektrische Lokomotive Mit Einzelsteuerung Je Radsatz," *Elektrische Bahnen,* 87(7), pp. 198-206 (1989).

* cited by examiner

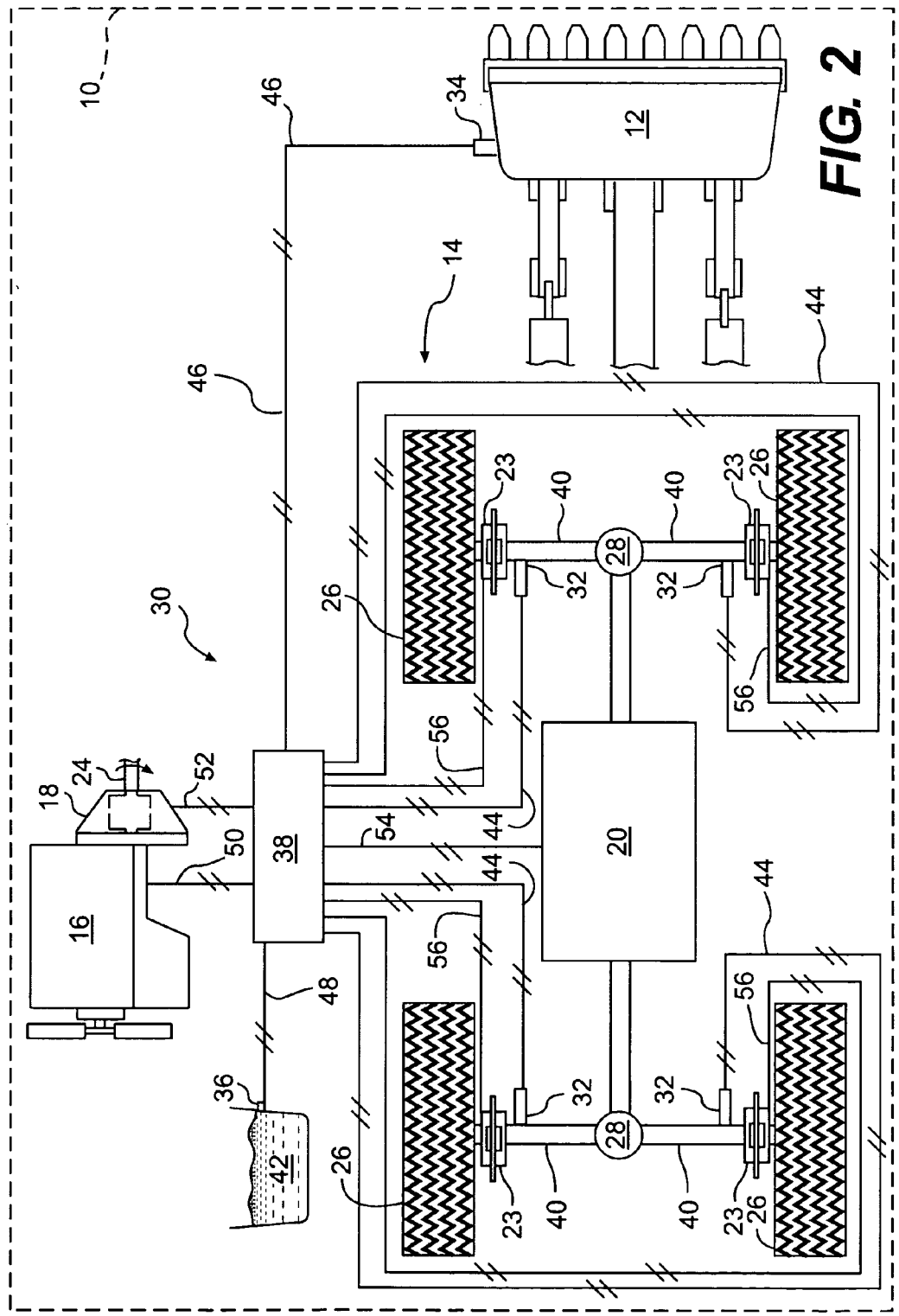

DRIVE SYSTEM HAVING SLIP CONTROL

TECHNICAL FIELD

This invention relates generally to a drive system and, more particularly, to a drive system having slip control.

BACKGROUND

Work machines such as, for example, wheel loaders, motor graders, dump trucks, and other types of heavy machinery are used for a variety of tasks. These work machines generally include a power source, which may be, for example, an engine, such as a diesel engine, gasoline engine, or gaseous fuel-powered engine that provides the power required to complete these tasks. To efficiently perform these tasks, the work machines utilize a transmission that is capable of transmitting the torque generated by the engine over a wide range of speeds. The transmission may include, for example, a mechanical transmission, an electric transmission, or a hydraulic transmission. These transmissions may be capable of providing a desired output torque at a desired speed within its operating range by changing a ratio of the transmission.

In some situations such as loading, unloading, uneven loading, or traveling over inconsistent, inclined, or soft or loose terrain, it may be possible for the driven traction devices to slip or spin faster than a traveling speed of the work machine. Slipping can decrease the efficiency of the work machine, increase wear of the traction device, decrease life of the drive train components, and possibly result in unexpected or undesired movement of the work machine.

Traditionally, slip of work machine driven traction devices has been addressed by determining that slip is occurring and then reducing a torque applied to the driven traction device. For example, U.S. Pat. No. 6,799,652 (the '652 patent) issued to Nissen et al. on Oct. 5, 2004 discloses a method of reducing slip of a driving wheel of an industrial truck. The method includes comparing a circumferential measured speed of the wheel to a set point and determining slip. If slip is occurring, the torque applied to a driving motor of the industrial truck is reduced.

Although the method of the '652 patent may minimize wheel slip, it does not prevent the industrial truck from experiencing the disadvantages associated with slipping. In particular, because the method minimizes slipping by measuring wheel slip, some slip must occur before any action is taken to minimize the slipping. By the time wheel slip has been determined and action is initiated, the disadvantages associated with slipping have already been experienced, even if the magnitude of slipping is then reduced.

The present disclosure is directed towards overcoming one or more of the problems as set forth above.

SUMMARY OF THE INVENTION

In accordance with one aspect, the present invention is directed toward a drive system for a work machine. The drive system includes at least one driven traction device and a transmission operatively connected to the at least one driven traction device. The transmission is configured to drive the at least one driven traction device. The drive system further includes a controller configured to determine a ground tractive capacity associated with the at least one driven traction device and to limit an amount of torque transmitted from the transmission to the at least one driven traction device when the amount of torque transmitted will exceed the ground tractive capacity.

According to another aspect, the present invention is directed toward a method of operating a drive system of a work machine having at least one driven traction device. The method includes determining a ground tractive capacity associated with the at least one driven traction device. The method further includes limiting an amount of torque transferred to the at least one driven traction device when the amount of torque to be transmitted will exceed the determined ground tractive capacity.

BRIEF DESCRIPTION OF THE DRAWINGS

FIG. 2 is a pictorial illustration of an exemplary slippage control system for the work machine of FIG. 1.

DETAILED DESCRIPTION

Figure 1:
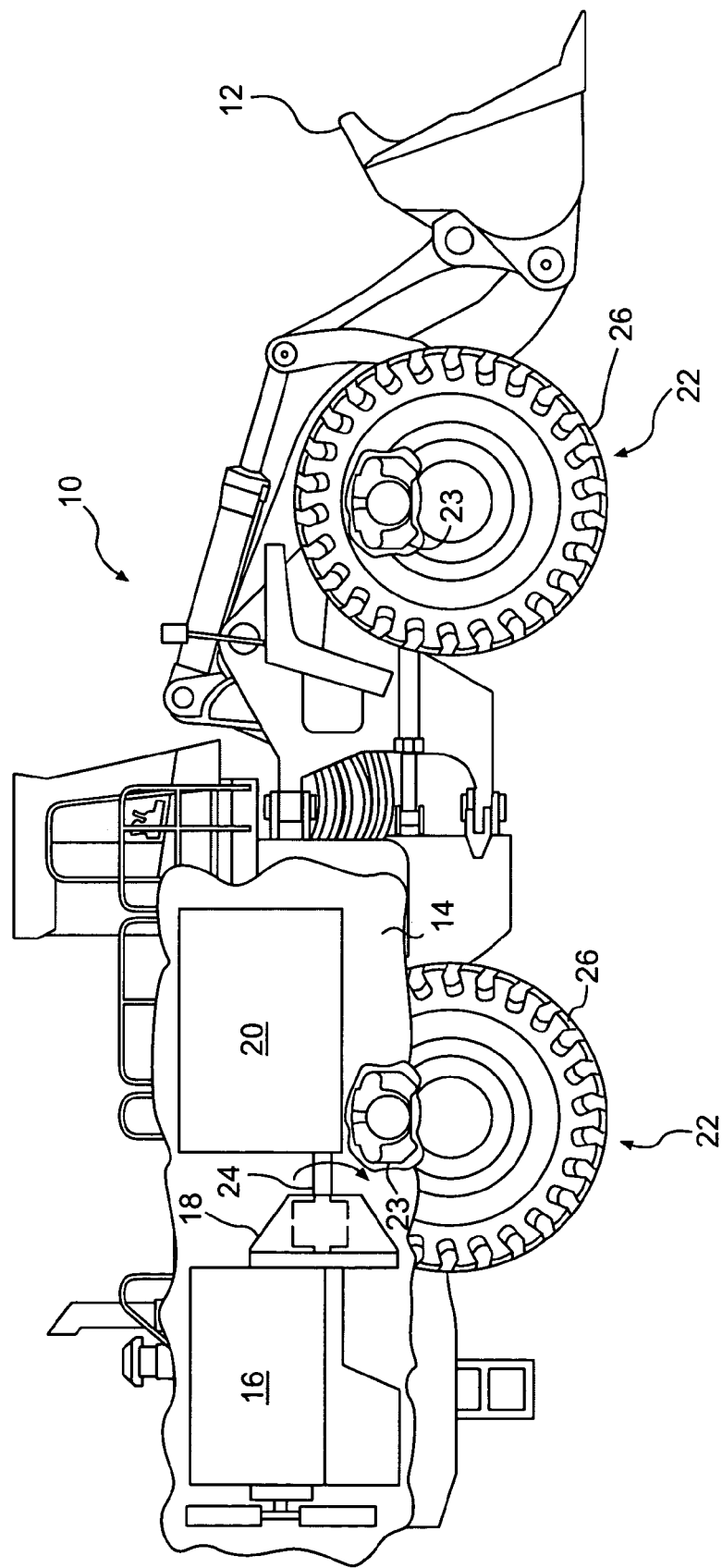
FIG. 1 is a pictorial and diagrammatic illustration of an exemplary disclosed work machine.

FIG. 1 illustrates an exemplary embodiment of a work machine 10. Work machine 10 may be a mobile machine that performs some type of operation associated with an industry such as mining, construction, farming, transportation, or any other industry known in the art. For example, work machine 10 may be an earth moving machine such as a wheel loader, a dump truck, a backhoe, a motor grader, or any other suitable operation-performing work machine. Work machine 10 may include a work implement 12 and a drive system 14.

Work implement 12 may include any device used to perform a particular task. For example, work implement 12 may include a bucket, a fork arrangement, a blade, a shovel, a ripper, a dump bed, a broom, a snow blower, a propelling device, a cutting device, a grasping device, or any other task-performing device known in the art. Work implement 12 may be connected to work machine 10 via a direct pivot, via a linkage system, via one or more hydraulic cylinders, or in any other appropriate manner. Work implement 12 may be configured to pivot, rotate, slide, swing, lift, or move relative to work machine 10 in any manner known in the art.

Drive system 14 may include components that interact to propel work machine 10. In particular, drive system 14 may include a power source 16, a torque converter 18, a transmission 20 connected to one or more driven traction devices 22, and a brake mechanism 23 associated with driven traction device 22. It is contemplated that additional and/or different components may be included within drive system 14 such as, for example, additional ratio reducing devices located between transmission 20 and driven traction device 22.

Power source 16 may include an internal combustion engine such as, for example, a diesel engine, a gasoline engine, a gaseous fuel-powered engine such as a natural gas engine, or any other engine apparent to one skilled in the art. Power source 16 may alternatively include another source of power such as a furnace, a battery, a fuel cell, a motor, or any other appropriate source of power. Power source 16 may be configured to produce a power output that is directed to torque converter 18.

Torque converter 18 may be a hydraulic device configured to couple power source 16 to transmission 20. Torque converter 18 may allow power source 16 to rotate somewhat independently of transmission 20. The amount of independent rotation between power source 16 and transmission 20 may be varied by modifying operation of torque converter 18. It is contemplated that torque converter 18 may alternatively embody a non-hydraulic device such as, for example, a mechanical diaphragm clutch. It is further contemplated that torque converter 18 may be omitted, if desired, and transmission 20 connected directly to power source 16.

Transmission 20 may be configured to transmit power from power source 16 to driven traction device 22 at a range of output speed ratios. Transmission 20 may embody a hydraulic transmission having one or more pumps (not shown) and hydraulic motors (not shown), a mechanical transmission having a mechanical gear train (not shown), a hydro-mechanical transmission having both hydraulic and mechanical components (not shown), an electric transmission having a generator (not shown) and one or more electric motors (not shown), or any other suitable transmission. An input drive member such as, for example, a countershaft 24, may connect transmission 20 to torque converter 18. In this manner, power generated by power source 16 may be transmitted through transmission 20 to driven traction device 22. It is contemplated that transmission 20 may alternatively transmit power from power source 16 to driven traction device 22 at only a single output speed ratio.

Various configurations of transmission 20 may be available to drive different driven traction devices 22 or pairs of driven traction devices 22 dependently or independent of each other. Driven traction devices 22 or pairs of driven traction devices 22 may be independently driven by separate transmissions 20 or, alternatively, by separate components of transmission 20. For example, a separate mechanical transmission 20 may be drivingly associated with each driven traction device 22 or pair of driven traction devices 22. Alternatively, a separate gear train, hydraulic motor, or electric motor of transmission 20 may be associated with and dedicated to each driven traction device 22 or pair of driven traction devices 22 with or without a separate dedicated transmission housing, pump, or generator.

Driven traction device 22 may include wheels 26 located on each side of work machine 10 (only one side shown). Alternatively, driven traction device 22 may include tracks, belts or other traction devices. As illustrated in FIG. 2, driven traction device 22 may include a differential gear assembly 28 configured to divide power from power source 16 between wheels 26 located on either side of work machine 10. Differential gear assembly 28 may allow wheels 26 on one side of work machine 10 to turn faster than wheels 26 located on an opposite side of work machine 10. It is contemplated that differential gear assembly 28 may be omitted, if desired.

Brake mechanism 23 may be configured to retard the motion of work machine 10 and may be operably associated with each wheel 26 of work machine 10. In one embodiment, brake mechanism 23 includes a hydraulic pressure-actuated wheel brake such as, for example a disk brake or a drum brake disposed proximal intermediate wheel 26. Brake mechanism 23 may be manually operated using a brake pedal (not shown), which in turn directs pressurized fluid to brake mechanism 23. A degree of brake pedal actuation may proportionally control a pressure of the fluid supplied to brake mechanism 23. Brake mechanism 23 may also be automatically operated in response to an electronic signal. It is contemplated that brake mechanism 23 may alternatively be pneumatically actuated, mechanically actuated, or actuated in any other manner known in the art.

Drive system 14 may further include a control system 30 configured to monitor and affect operation of drive system 14. In one example, control system 30 includes a speed sensor 32 associated with each wheel 26, a payload sensor 34, a fluid level sensor 36, and a controller 38. It is contemplated that control system 30 may include additional or different components.

Speed sensor 32 may be configured to sense a speed of an associated wheel 26. For example, speed sensor 32 may be embodied in a magnetic pick up sensor configured to sense a rotational speed of wheel 26 and to produce a signal corresponding to the rotational speed. Speed sensor 32 may be disposed on an axle 40, on a component of wheel 26, or on any other suitable component of drive system 14 to produce a signal corresponding to the rotational speed of one of the wheels 26 of work machine 10.

Payload sensor 34 may be configured to sense a load on work implement 12 and/or a distribution of a load on work implement 12. Payload sensor 34 may include, for example, one or more strut pressure monitors associated with the suspension of wheels 26, a bucket or bed pressure monitor, a hydraulic cylinder and linkage position or pressure monitor, or any other type of payload sensor known in the art. Payload sensor 34 may be configured to produce a signal indicative of the load and/or distribution of the load on work implement 12.

Fluid level sensor 36 may be configured to sense a level of fluid within a tank 42 of work machine 10. The fluid may include for example, a fuel, a lubrication oil, a hydraulic oil, or any other type of fluid present on work machine 10. Fluid level sensor 36 may embody a float type sensor, a sonar type sensor, or any other type of sensor that is capable of determining a level of a fluid within tank 42. Fluid level sensor 36 may be situated within tank 42 or external to tank 42, and may output a signal indicative of the fluid level such as, for example, a signal indicating a percent of a full tank. The sensed fluid level may be used in conjunction with a known volume of tank 42 and an assumed or monitored density of fluid within tank 42 to determine a load applied to wheels 26 as a result of fluid within tank 42.

Controller 38 may be embodied in a single microprocessor or multiple microprocessors that include a means for controlling an operation of drive system 14. Numerous commercially available microprocessors can be configured to perform the functions of controller 38. It should be appreciated that controller 38 could readily be embodied in a general work machine microprocessor capable of controlling numerous work machine functions. Various other known circuits may be associated with controller 38, including power supply circuitry, signal-conditioning circuitry, solenoid driver circuitry, communication circuitry, and other appropriate circuitry.

Controller 38 may be in communication with the components of drive system 14. In particular, controller 38 may be in communication with speed sensors 32 via communication lines 44, with payload sensor 34 via a communication line 46, with fluid level sensor 36 via a communication line 48, with power source 16 via a communication line 50, with torque converter 18 via a communication line 52, with transmission 20 via a communication line 54, and with brake mechanism 23 via a communication line 56. Communication Lines 44-56 may be digital, analog, or mixed types of communication lines. Alternatively, communication with the components of drive system 14 may be implemented by means of mechanical or hydraulic connections.

Controller 38 may receive signals from speed sensors 32 and determine if one or more of wheels 26 are slipping. For the purposes of this disclosure, wheel slip may be defined as unintended relative movement between wheel 26 and a ground surface. Slipping may be determined by comparing the speed signals from speed sensors 32 associated with different wheels 26 and determining that the value of one or more individual speed signals are substantially different than the other individual signals, different than an average of the other speed signals, different than a speed signal associated with a non-driven traction device (not shown) and/or different from a travel speed of work machine 10. The travel speed of work machine 10 may be determined from a laser or radar speed measuring system (not shown).

Controller 38 may be further configured to determine when a torque applied to one or more wheels 26 will result in wheel 26 slipping, before the torque is applied to wheel 26. In particular, controller 38 may determine a ground tractive capacity for each wheel 26 based on a loading condition of the wheel 26. For the purposes of this disclosure, the ground tractive capacity is defined as the amount of torque applied to an individual wheel 26, above which slipping of wheel 26 is likely to occur. The load on wheel 26 may be determined in response to input from payload sensor 34, fluid level sensor 36, and a known weight distribution of work machine 10. It is contemplated that the load on each wheel 26 may alternatively be determined based only on input from payload sensor 34 and the known weight distribution of work machine 10. The ground tractive capacity may then be estimated for each wheel 26 based on the determined wheel load, a coefficient of friction, and the geometry of wheel 26. Provided below is an exemplary equation for estimating the ground tractive capacity.

$$C_{gt} = F_n \times \mu \times r$$

where:

$C_{gt}$ is the estimated ground tractive capacity;

$F_n$ is the force on wheel 26 in the normal direction relative to the engagement surface of wheel 26;

$\mu$ is the coefficient of friction; and r is the radius of wheel 26;

If additional ratio reducing devices are included between transmission 20 and wheel 26, the estimated ground tractive capacity value may be divided by the reduction ratio to determine an amount of torque output from transmission 20 that will result in wheel 26 slipping. In order to minimize the likelihood of wheel 26 slipping, the torque transmitted from transmission 20 to wheel 26 should be limited to less than the estimated ground tractive capacity.

The coefficient of friction used to estimate the ground tractive capacity may vary depending on the composition of the ground surface and may be updated manually or automatically. Specifically, the coefficient of friction may be indicative of the capacity of the ground to oppose a force transmission from wheel 26. A ground surface having a soft or loose composition may have a lower coefficient of friction when compared to a ground surface having a hard or cohesive composition. The coefficient of friction may be updated manually by a work machine operator to correspond with the current ground composition found at a particular work site. The coefficient of friction may also be automatically updated based on an assumed coefficient of friction and the occurrence of wheel slippage.

Controller 38 may be configured to reduce an amount of torque transferred from transmission 20 to wheel 26 in one of several ways. Controller 38 may lower an output of power source 16 that drives transmission 20, thereby lowering a torque output of transmission 20. The output of power source 16 may be lowered by reducing a fuel setting, reducing an air intake, changing an ignition timing, actuating an engine brake, or in any other suitable manner. Controller 38 may also change operation of transmission 20 to lower a torque output of transmission 20. Specifically, controller 38 may shift a mechanical transmission to a higher gear ratio, change a displacement of the pump and/or motor of a hydraulic transmission, or command a lower torque output of the generator or motor in an electric transmission. Controller 38 may also change operation of torque converter 18 to transfer less torque from power source 16 to transmission 20, thereby lowering a torque output of transmission 20, or may actuate brake mechanism 23 to absorb torque output from transmission 20 before it is transferred to wheel 26.

Controller 38 may be further configured to reduce an amount of torque transferred from transmission 20 to wheel 26 when the torque will result in wheel 26 slipping. In particular, if controller 38 determines that a desired or intended torque output of transmission 20 will exceed the estimated ground tractive capacity, controller 38 may initiate one of the torque reducing strategies described above, before wheel 26 slips. If controller 38 reduces the torque transfer to wheel 26 and wheel 26 still slips, controller 38 may lower the value of the coefficient of friction used for future slip control of drive system 14. That is, if controller 38 implements a coefficient of friction to prevent slipping and wheel 26 still slips, the coefficient of friction has too high of a value and controller 38 may lower the value of the coefficient of friction for future estimations. The amount that the coefficient of friction is lowered may be preset or may vary depending on the magnitude of slipping that occurred.

The coefficient of friction may vary according to location. In particular, a work site may have varying terrain or ground conditions over which work machine 10 may maneuver. In order to compensate for the varying terrain and ground conditions, controller 38 may be configured to automatically implement a different coefficient of friction according to location, as determined, for example, from a GPS (Global Positioning Satellite) system. The coefficient of friction may also be manually updated according to changing terrain and ground conditions.

Controller 38 may limit an amount of torque transferred from transmission 20 to wheel 26 in further response to a design limit of one or more components of drive system 14. Specifically, because wheels 26 of the drive system 14 illustrated in FIG. 2 are dependently driven, when one or more wheels 26 slip, torque may be transferred from the slipping wheel(s) 26 to the gripping wheel(s) 26. This transfer of torque may be large enough to damage the components associated with the gripping wheel(s) 26. In order to minimize the likelihood of component damage, if controller 38 determines that wheel 26 is likely to slip, controller 38 may limit a total torque transferred from transmission 20 to wheels 26 to an amount equal to or less than the sum of the estimated ground tractive capacity of the wheel(s) likely to slip and the design limit of the remaining wheel(s) 26. In this manner, if one or more wheels 26 happen to slip, the subsequent torque transfer to the gripping wheels 26 will not exceed a design limit of the drive system components associated with the gripping wheels 26.

INDUSTRIAL APPLICABILITY

The disclosed drive system finds potential application in any mobile machine where it is desirable to minimize wheel slip while protecting the components of the drive system. The disclosed system improves slip control by minimizing the likelihood of wheel slip before slipping occurs. Operation of drive system 14 will now be described.

During operation, controller 38 may determine the loading condition of each wheel 26 to assess the likelihood of slipping. In particular, controller 38 may determine a load and/or distribution of load on work implement 12 and a load generated by the presence of fluid on work machine 10 such as fuel, and sum these transient loading conditions with the known weight distribution of work machine 10. Controller 38 may then calculate an estimated ground tractive capacity, which if exceeded, will cause one or more of wheels 26 to slip. Controller 38 may then compare an intended torque application for a particular wheel 26 with the estimated ground tractive capacity calculated for that particular wheel 26 to determine if the intended torque application should be reduced.

If the intended torque application exceeds the estimated ground tractive capacity, controller 38 may reduce the actual applied torque. The intended torque application is determined in direct response to an operator input via an accelerator device such as, for example, a throttle pedal. The actual applied torque may be reduced by lowering an output of power source 16, changing operation of transmission 20 or torque converter 18, and/or by actuating brake mechanism 23. In situations where drive system 14 includes one or more dependently driven wheels 26, controller 38 may reduce the applied torque to the sum of the estimated ground tractive capacity and any design limits that may exist for the other dependently driven components.

If controller 38 reduces the torque applied to one or more wheels 26 of drive system 14 and the wheels 26 still slip, the coefficient of friction may be automatically reduced to compensate for the changing ground conditions. The coefficient may also be manually updated by a work machine operator to accommodate for changing ground conditions.

Controller 38 may improve efficiency and component life of drive system 14. Specifically, because controller 38 minimizes the likelihood of wheel slip before slipping occurs, the inefficiencies associated with slipping may be substantially minimized or even eliminated. Further, because controller 38 limits torque transmission to dependently driven wheels 26 in response to the estimated ground tractive capacity and in response to component design limitations, the components of drive system 14 may have a longer life even if wheel slip does occur, as compared to traditional systems.

It will be apparent to those skilled in the art that various modifications and variations can be made to the drive system of the present disclosure. Other embodiments of the drive system will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A drive system for a machine, the drive system comprising:
   at least one driven traction device;
   a transmission operatively connected to the at least one driven traction device and configured to drive the at least one driven traction device; and
   a controller configured to determine, before the at least one driven traction device is allowed to slip, a ground tractive capacity associated with the at least one driven traction device and to limit an amount of torque transmitted from the transmission to the at least one driven traction device when the amount of torque to be transmitted would exceed the ground tractive capacity absent any intervention, the controller being further configured to determine the ground tractive capacity as a function of a stored value that is indicative of a coefficient of friction between the at least one driven traction device and a ground surface.

2. The drive system of claim 1, wherein the transmission includes an electric motor.

3. The drive system of claim 1, wherein the transmission includes a hydraulic motor.

4. The drive system of claim 1, wherein the transmission includes a mechanical transmission.

5. The drive system of claim 1, further including a power source configured to supply power to the transmission, wherein the transmitted torque is limited by limiting an output of the power source.

6. The drive system of claim 1, wherein the transmitted torque is limited by changing operation of the transmission.

7. The drive system of claim 1, further including a braking mechanism associated with the at least one driven traction device, wherein the transmitted torque is limited by actuating the braking mechanism.

8. The drive system of claim 1, wherein the ground tractive capacity is determined as a function of a loading condition of the machine.

9. The drive system of claim 8, wherein the loading condition of the machine includes a load on an implement of the machine.

10. The drive system of claim 9, wherein the loading condition of the machine further includes a distribution of the load on the machine.

11. The drive system of claim 9, wherein the loading condition of the machine further includes an amount of fluid in a tank of the machine.

12. The drive system of claim 9, wherein the implement includes at least one of a fork arrangement, a blade, a shovel, a ripper, a broom, a snow blower, and a cutting device.

13. The drive system of claim 1, wherein the stored value is automatically updated in response to torque transmitted to the at least one driven traction device causing the at least one driven traction device to slip.

14. The drive system of claim 1, wherein the stored value is automatically updated in response to a location of the machine.

15. The drive system of claim 1, wherein:
   the at least one driven traction device is a first driven traction device,
   the drive system further includes a second driven traction device;
   the transmission is operatively connected to the second driven traction device and configured to drive the second driven traction device; and
   the controller is configured to limit a total amount of torque transmitted from the transmission to the first and second driven traction devices to the sum of a design limit of the second driven traction device and the ground tractive capacity associated with the first driven traction device.

16. A method of operating a drive system of a machine having at least one driven traction device, the method including:
   determining a ground tractive capacity associated with the at least one driven traction device, including referencing a value indicative of a coefficient of friction between the at least one driven traction device and a ground surface; and
   limiting, prior to any slip occurrence, an amount of torque transferred to the at least one driven traction device when the amount of torque to be transmitted will exceed the determined ground tractive capacity.

17. The method of claim 16, wherein:
   the machine includes a transmission operably connected to a power source;
   the transmission is configured to transmit torque to the at least one driven traction device; and
   the amount of torque transferred is limited by limiting an output of the power source.

18. The method of claim 16, wherein:
the machine includes a transmission operably connected to a power source;
the transmission is configured to transmit torque to the at least one driven traction device; and
the amount of torque transferred is limited by changing operation of the transmission.

19. The method of claim 16, wherein:
the machine includes a braking mechanism associated with the at least one driven traction device; and
the amount of torque transferred is limited by actuating the braking mechanism.

20. The method of claim 16, wherein determining the ground tractive capacity includes determining a load on the machine.

21. The method of claim 20, wherein determining the load further includes determining a distribution of a load on the machine.

22. The method of claim 21, wherein determining the load further includes determining an amount of fluid in a tank of the machine.

23. The method of claim 20, further including automatically updating the value in response to the amount of torque transmitted to the at least one traction device causing the at least one driven traction device to slip.

24. The method of claim 20, further including automatically updating the value in response to a location of the machine.

25. The method of claim 16, wherein:
the at least one driven traction device is a first driven traction device;
the machine includes a second driven traction device; and
the method further includes:
limiting a total amount of torque transmitted from a transmission to the first and second driven traction devices to the sum of a design limit of the second driven traction device and the ground tractive capacity associated with the first driven traction device.

26. A machine, comprising:
a power source configured to produce a power output;
a plurality of driven traction devices;
a transmission operably connected to the power source and configured to drive the plurality of driven traction devices; and
a controller configured to individually determine a ground tractive capacity associated with each of the plurality of driven traction devices and to individually limit an amount of torque transmitted from the transmission to one or more of the plurality of driven traction devices when the amount of torque to be transmitted to one or more of the plurality of driven traction devices would exceed, absent any torque limiting, the current ground tractive capacity of the one or more of the plurality of driven traction devices.

27. The machine of claim 26, wherein the transmission includes at least one of an electric motor, a hydraulic motor, and a mechanical transmission.

28. The machine of claim 26, further including a braking mechanism associated with the plurality of driven traction devices, wherein the transmitted torque is limited by at least one of limiting an output of the power source, changing operation of the transmission, and actuating the braking mechanism.

29. The machine of claim 28, wherein:
the controller is configured to limit an amount of torque transmitted from the transmission to the plurality of driven traction devices to the sum of a design limit of a first one of the plurality of driven traction devices and the ground tractive capacity associated with a second one of the plurality of driven traction devices.

30. The machine of claim 26, wherein:
the ground tractive capacity is determined as a function of a loading condition of the machine;
the controller includes a memory having a value stored therein that is indicative of a coefficient of friction between the plurality of driven traction devices and a ground surface; and
the ground tractive capacity is determined as a function of the stored value.

31. The machine of claim 30, wherein the value is automatically updated in response to the amount of torque transmitted to the plurality of driven traction devices causing at least one of the plurality of driven traction devices to slip.

32. The machine of claim 30, wherein the value is automatically updated in response to a location of the machine.

33. The machine of claim 26, further comprising at least one of a fork arrangement, a blade, a shovel, a ripper, a broom, a snow blower, and a cutting device.

* * * * *